(12) United States Patent
Roggenkemper et al.

(10) Patent No.: US 12,694,235 B2
(45) Date of Patent: Jul. 28, 2026

(54) ADAPTABLE TRANSFORMER MODELS VIA KEY TERM REPLACEMENT

(71) Applicant: PayPal, Inc., San Jose, CA (US)

(72) Inventors: Ryan Alan Roggenkemper, Los Gatos, CA (US); Soujanya Lanka, Singapore (SG)

(73) Assignee: PayPal, Inc., San Jose, CA (US)

( * ) Notice: Subject to any disclaimer, the term of this patent is extended or adjusted under 35 U.S.C. 154(b) by 370 days.

(21) Appl. No.: 17/934,740

(22) Filed: Sep. 23, 2022

(65) Prior Publication Data

US 2024/0104310 A1      Mar. 28, 2024

(51) Int. Cl.
*G06F 40/56*          (2020.01)
*G06F 16/355*        (2025.01)
*G06F 40/284*        (2020.01)

(52) U.S. Cl.
CPC ............ *G06F 40/56* (2020.01); *G06F 16/355* (2019.01); *G06F 40/284* (2020.01)

(58) Field of Classification Search
CPC ...... G06F 40/30; G06F 3/04842; G06F 30/27; G06F 3/0482; G06F 16/71; G06F 40/20; G06F 40/284; G06F 40/56; G06F 40/295; G06F 16/90332; G06F 40/10; G06F 40/205
See application file for complete search history.

(56) References Cited

U.S. PATENT DOCUMENTS

| | | | | |
|---|---|---|---|---|
| 7,409,336 B2 * | 8/2008 | Pak | ..................... | G10L 15/1822 |
| | | | | 707/999.001 |
| 10,169,315 B1 * | 1/2019 | Heckel | .................. | G06F 40/166 |
| 10,755,051 B2 | 8/2020 | Piernot et al. | | |
| 10,789,426 B2 | 9/2020 | Lavallee et al. | | |
| 11,409,945 B2 | 8/2022 | McCann et al. | | |
| 2015/0309987 A1 * | 10/2015 | Epstein | ................... | G06F 40/30 |
| | | | | 704/9 |
| 2018/0018576 A1 * | 1/2018 | Boyer | ................... | G06F 16/355 |
| 2020/0142999 A1 * | 5/2020 | Pedersen | ................ | G06F 16/35 |
| 2021/0165960 A1 * | 6/2021 | Eisenschlos | .......... | G06F 40/253 |
| 2021/0248316 A1 * | 8/2021 | Wroczynski | .......... | G06F 40/216 |
| 2022/0164472 A1 * | 5/2022 | Cannon | .............. | G06F 21/6245 |
| 2024/0296858 A1 * | 9/2024 | Huffman | ................ | G10L 25/63 |

* cited by examiner

*Primary Examiner* — Richemond Dorvil
*Assistant Examiner* — Zeeshan Mahmood Shaikh
(74) *Attorney, Agent, or Firm* — Kowert, Hood, Munyon, Rankin & Goetzel, P.C.; Scott W. Pape; Dean M. Munyon

(57) ABSTRACT
Techniques are disclosed relating to storing, by a computer system, a map file that includes a new term that is mapped to a particular one of a plurality of category names that a natural-language processing (NLP) model is trained to identify, wherein the NLP model is not trained to identify the new term. The technique may further include receiving, by the computer system, user-generated content (UGC) that includes the new term. Additionally, the technique may include generating, by the computer system using the map file, a modified version of the UGC by substituting the particular category name for text in the UGC that is associated with the new term, and using, by the computer system, the NLP model on the modified text to classify the modified version of the UGC without retraining the NLP model to identify the new term.

20 Claims, 10 Drawing Sheets

*Computer System 100*
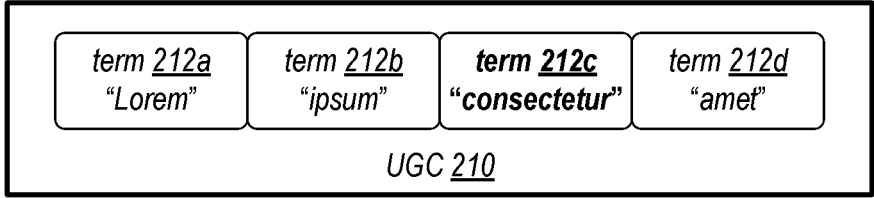
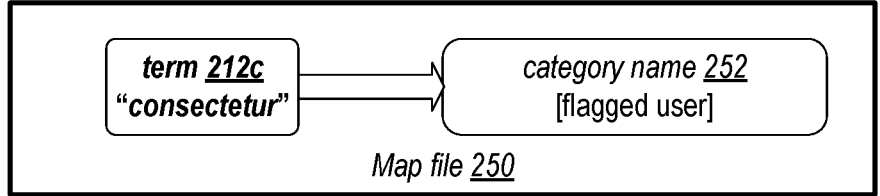
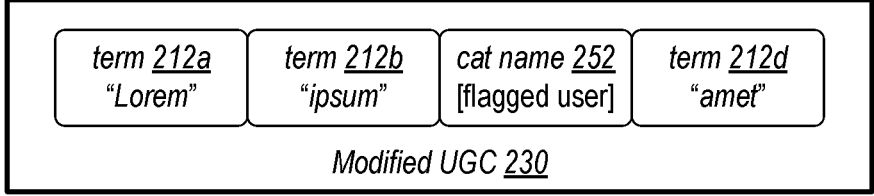
| read term 220 | tokenized term 225 | numeric vector 227 |
|---|---|---|
| "Lorem" | "Lorem" | 123, 456, 789 |
|  | "Lore" | 123, 450, 789 |
|  | "Lor" | 123, 0, 789 |
|  | "Lo" | 123, 0, 0 |
|  | "L" | 120, 1, 2 |
| "ipsum" | "ipsum" | 333, 276, 951 |
|  | "ipsu" | 333, 270, 951 |
|  | "ips" | 333, 270, 900 |
|  | "ip" | 333, 270, 0 |
|  | "i" | 333, 1, 1 |
| "[flagged user]" | "[flagged user]" | 222, 444, 864 |
| "amet" | "amet" | 827, 345, 232 |
|  | "ame" | 827, 330, 200 |
|  | "am" | 800, 300, 200 |
|  | "a" | 800, 300, 1 |
*NLP Model 140*
*FIG. 2*

Figure 3:
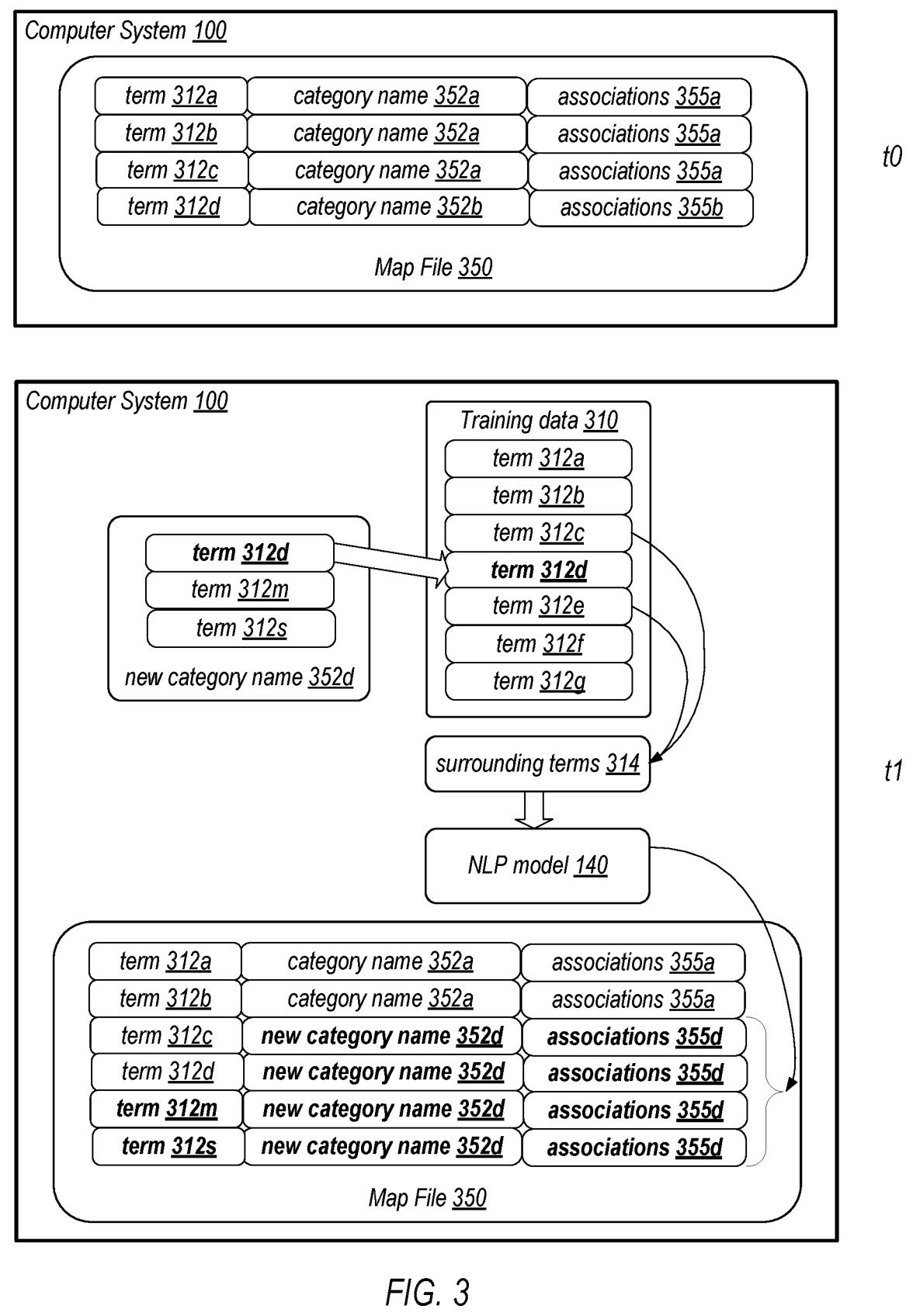

*Computer System 100*

| term 312a | category name 352a | associations 355a |
| term 312b | category name 352a | associations 355a |
| term 312c | category name 352a | associations 355a |
| term 312d | category name 352b | associations 355b |

*Map File 350*

*t0*

*Computer System 100*

*Training data 310* term 312a
term 312b
term 312c
term 312d
term 312e
term 312f
term 312g term 312d
term 312m
term 312s

*new category name 352d*

*surrounding terms 314*

*NLP model 140*

| term 312a | category name 352a | associations 355a |
| term 312b | category name 352a | associations 355a |
| term 312c | new category name 352d | associations 355d |
| term 312d | new category name 352d | associations 355d |
| term 312m | new category name 352d | associations 355d |
| term 312s | new category name 352d | associations 355d |

*Map File 350*

*Computer System* <u>100</u>
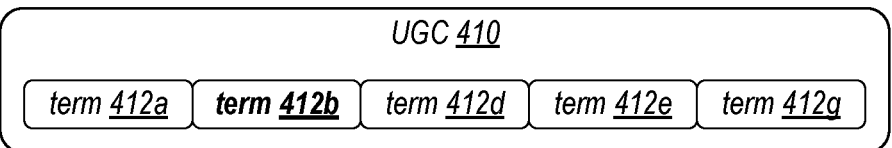
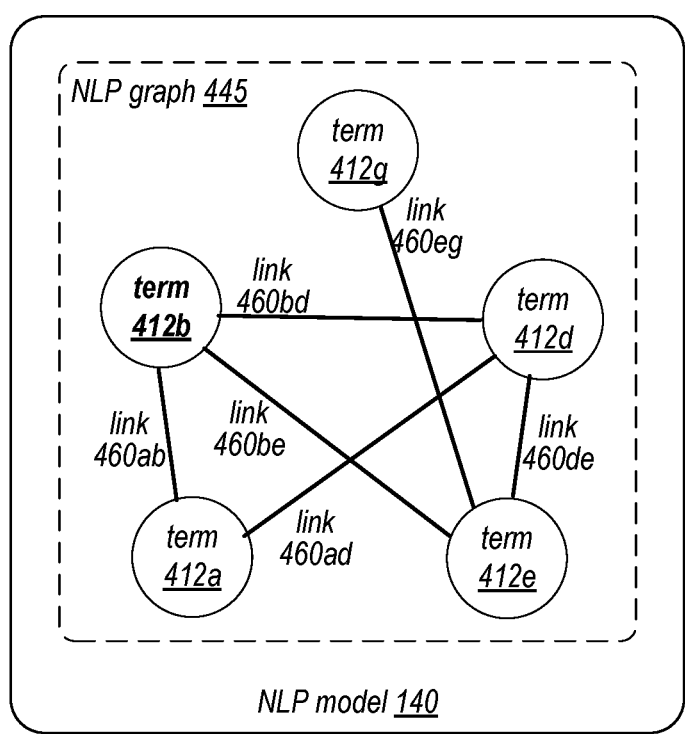
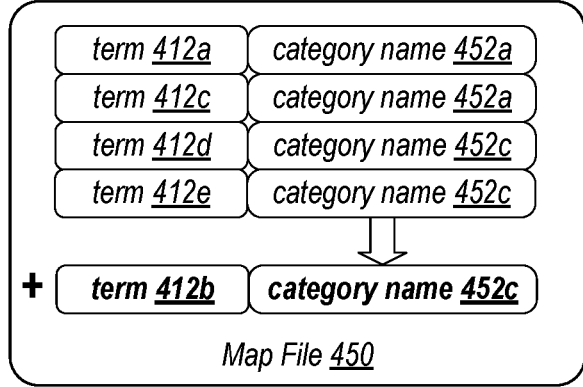
FIG. 4

*Example 600a*

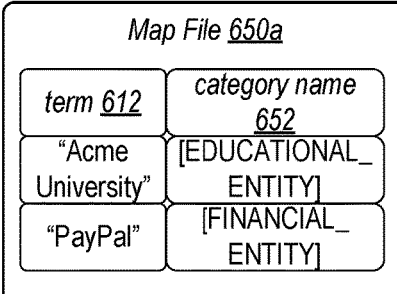

| UGC 610a | Map File 650a | | modified UGC 630a |
|---|---|---|---|
| "Acme University has announced acceptance of PayPal for tuition payments." | *term 612* | *category name 652* | "[EDUCATIONAL_ENTITY] has announced acceptance of [FINANCIAL_ENTITY] for tuition payments." |
| | "Acme University" | [EDUCATIONAL_ ENTITY] | |
| | "PayPal" | [FINANCIAL_ ENTITY] | |

*Example 600b*

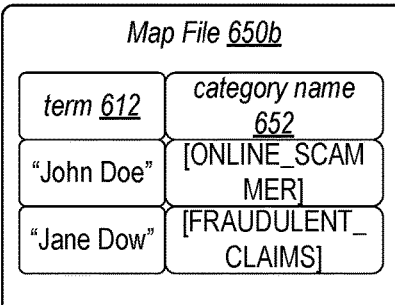

| UGC 610b | Map File 650b | | modified UGC 630b |
|---|---|---|---|
| "John Doe has sent you invite to a seminar on snipe ranching opportunities." | *term 612* | *category name 652* | "[ONLINE_SCAMMER] has sent you invite to a seminar on snipe ranching opportunities." |
| | "John Doe" | [ONLINE_SCAM MER] | |
| | "Jane Dow" | [FRAUDULENT_ CLAIMS] | |

*Example 600c*

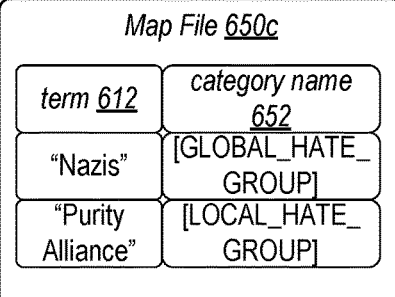

| UGC 610c | Map File 650c | | modified UGC 630c |
|---|---|---|---|
| "The Nazis had some interesting ideas. Come explore membership in the Purity Alliance today." | *term 612* | *category name 652* | "The [GLOBAL_HATE_GROUP] had some interesting ideas. Come explore membership in the [LOCAL_HATE_GROUP] today." |
| | "Nazis" | [GLOBAL_HATE_ GROUP] | |
| | "Purity Alliance" | [LOCAL_HATE_ GROUP] | |

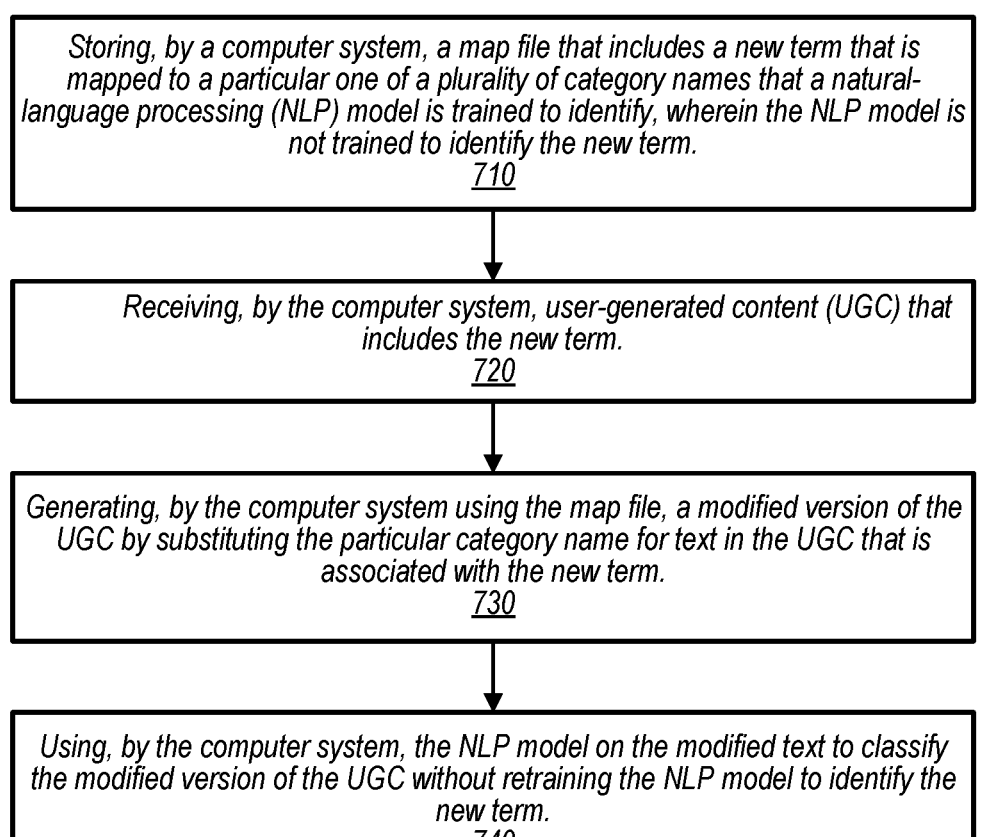

Storing, by a computer system, a map file that includes a new term that is mapped to a particular one of a plurality of category names that a natural-language processing (NLP) model is trained to identify, wherein the NLP model is not trained to identify the new term.
710

Receiving, by the computer system, user-generated content (UGC) that includes the new term.
720

Generating, by the computer system using the map file, a modified version of the UGC by substituting the particular category name for text in the UGC that is associated with the new term.
730

Using, by the computer system, the NLP model on the modified text to classify the modified version of the UGC without retraining the NLP model to identify the new term.
740

_FIG. 7_

<u>800</u>

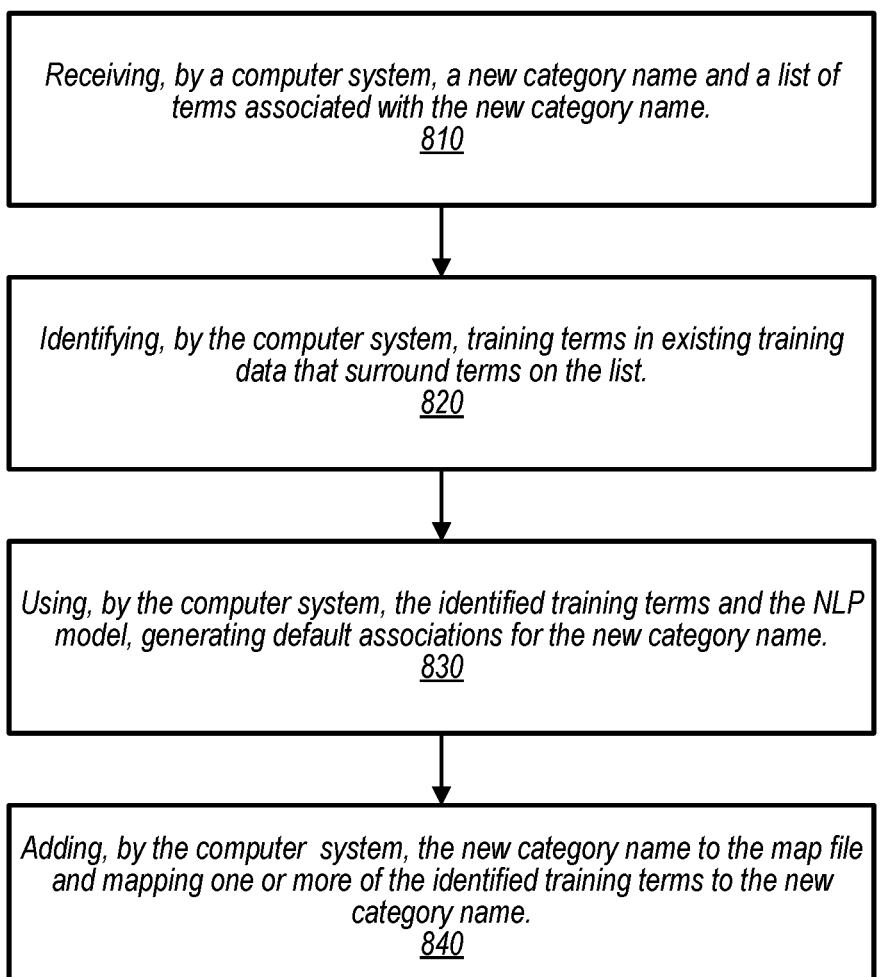

*Receiving, by a computer system, a new category name and a list of terms associated with the new category name.*
<u>810</u>

*Identifying, by the computer system, training terms in existing training data that surround terms on the list.*
<u>820</u>

*Using, by the computer system, the identified training terms and the NLP model, generating default associations for the new category name.*
<u>830</u>

*Adding, by the computer system, the new category name to the map file and mapping one or more of the identified training terms to the new category name.*
<u>840</u>

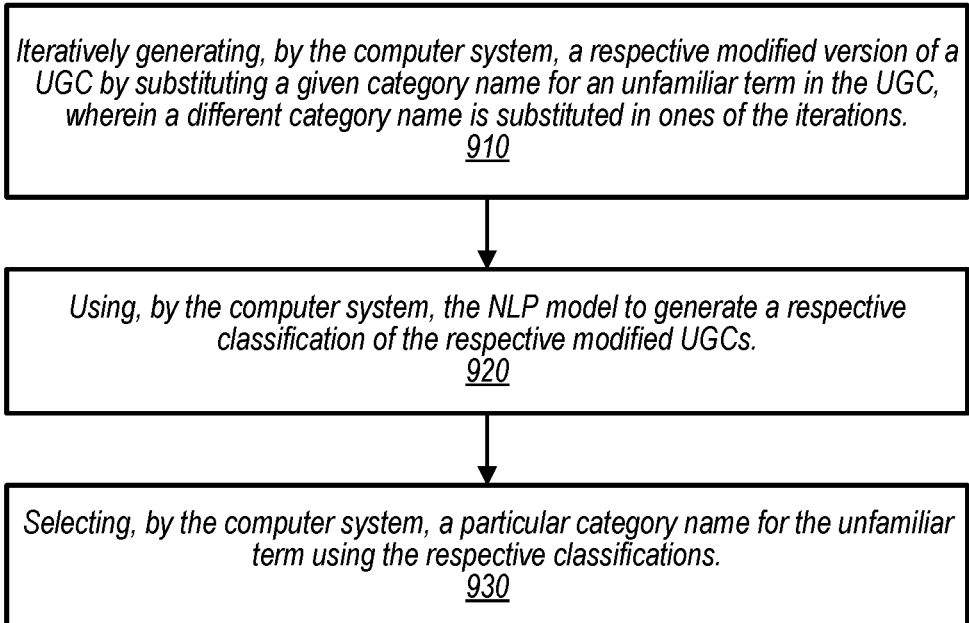

*Iteratively generating, by the computer system, a respective modified version of a UGC by substituting a given category name for an unfamiliar term in the UGC, wherein a different category name is substituted in ones of the iterations.*
_910_

*Using, by the computer system, the NLP model to generate a respective classification of the respective modified UGCs.*
_920_

*Selecting, by the computer system, a particular category name for the unfamiliar term using the respective classifications.*
_930_

*FIG. 9*

ADAPTABLE TRANSFORMER MODELS VIA KEY TERM REPLACEMENT

BACKGROUND

Technical Field

Embodiments described herein are related to the field of natural-language processing, and more particularly to techniques for managing transformer models to detect new terminology.

Description of the Related Art

Many online services support user-generated content. Such online services may desire and/or be regulated to identify particular terminology, such as fraudulent activity, identity information, hate speech, slander, and the like. User-generated content may include new terminology, such as terms related to new technology, new organizations, new cultural references, and so forth. An online service may include a large number of users, from thousands of users to millions of users. Natural-language processing (NLP) may be utilized in a machine-learning model to identify terminology of interest. Machine learning models, however, may struggle to identify terms of interest in a dynamically changing vocabulary.

BRIEF DESCRIPTION OF THE DRAWINGS

The following detailed description makes reference to the accompanying drawings, which are now briefly described.

FIG. 2 shows an example of a text categorization and substitution technique for use with user-generated content.

FIG. 3 depicts an example of a technique for using surrounding terms to categorize a new term.

FIG. 4 illustrates an embodiment for using a graph-based natural-language processing model for categorizing a new term.

FIG. 6 depicts three examples for term substitution within user-generated content for use with a natural-language processing model.

FIG. 7 illustrates a diagram of an embodiment of a method for modifying user-generated content to be processed by a natural-language processing model.

FIG. 8 shows a flow diagram of an embodiment of a method for adding a category name to a natural-language processing model.

FIG. 9 depicts a flow diagram of an embodiment of a method for iteratively determining classifications for differently modified versions of user-generated content.

DETAILED DESCRIPTION OF EMBODIMENTS

Figure 1:
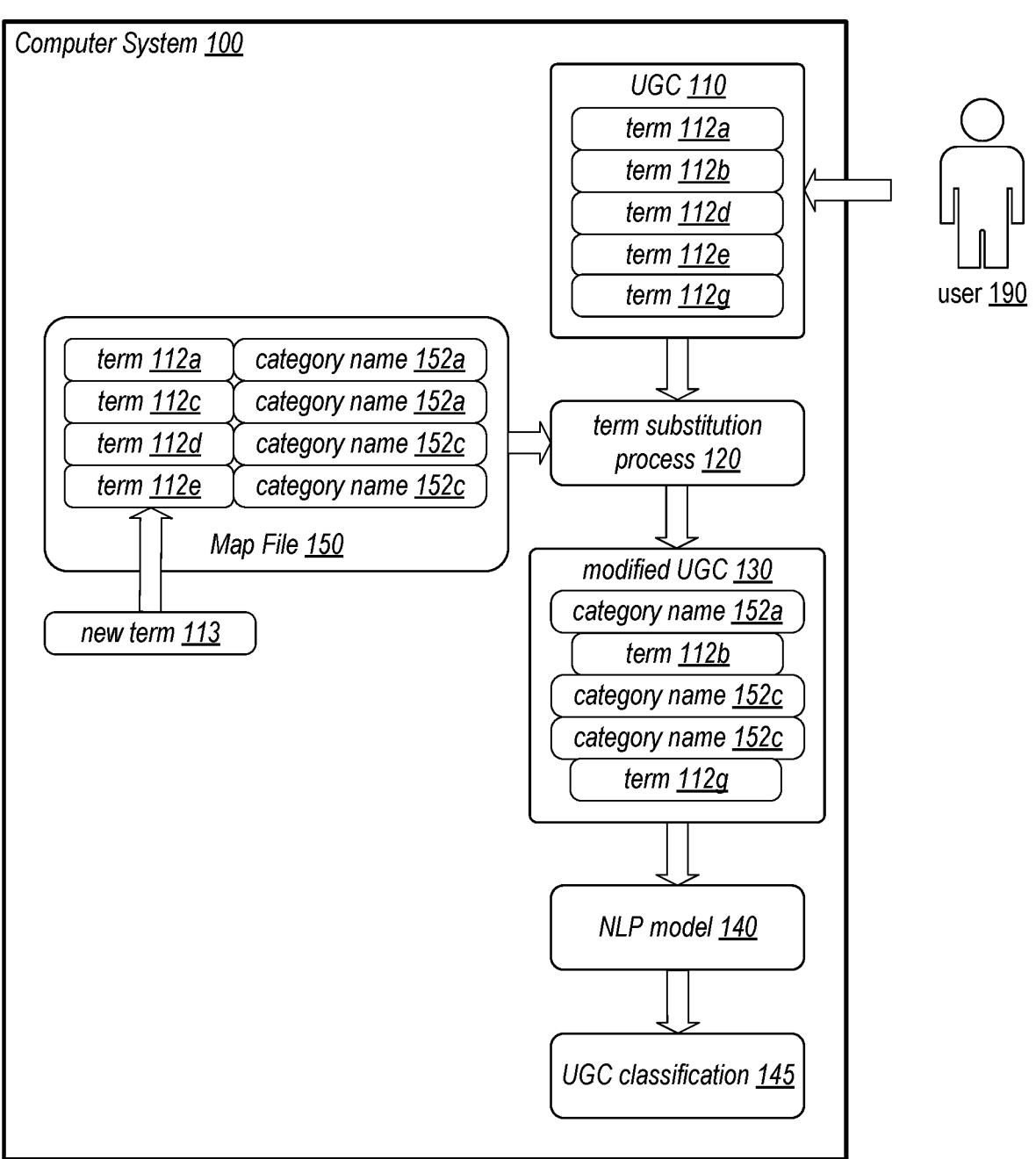
FIG. 1 illustrates a block diagram of an embodiment of a computer system for operating a natural-language processing model.

Natural Language Processing (NLP) transformer models may generally be used to review user-generated content and detect particular terminology. An NLP transformer model (also referred to herein as an "NLP model" or "transformer model") may evaluate a string of individual terms (e.g., a sentence, phrase, or paragraph) as one data input. The NLP model may then identify individual terms, or even portions of terms, within the data input, and assign associations between two or more terms in the input, thereby providing a capability to determine context of a given term in the input based on other words in the input. To do this, however, the NLP model needs to trained to recognize particular definitions and context of the different terms in the input.

NLP models, however, may struggle to detect new or infrequently used terminology. NLP models may underperform for detecting user-generated content containing new terminology, resulting in false negatives, in which terms of interest are not detected. Initially, NLP models may be trained on large established datasets where new terminology is absent or used infrequently. Additionally, even known terms may not be properly recognized if a new meaning or context has been assigned to the known term through popular, contemporary usage. Accordingly, an NLP model trained using established datasets may struggle to learn proper associations for new terms until the new terms (or terms with new usage) become widespread in use.

Existing approaches to account for new terminology generally require additional data relating to the new terms to be gathered and used to update the established training datasets. Existing models may then be retrained using the updated training datasets, requiring hours of time for administrators to perform the retraining and computational overhead that could otherwise be utilized to provide services to online users.

Proposed techniques disclosed herein may improve performance of NLP models to detect particular terms of interest within user-generated content. A particular technique includes preprocessing inputs to an NLP model (e.g., during training, evaluation, and/or production usage), replacing specific terms related to new terminology with broader categories. Groupings of new terms within content to be analyzed are mapped into these broader categories. Occurrences of these new terms are replaced with the mapped category name. The category names are trained in the NLP model such that the category name is processed as a known term and the NLP model does not attempt to tokenize the category name.

Use of such techniques may expand a list of tracked new terms into a hierarchy. By doing so, new terminology being tracked may be explicitly group together. This grouping allows easy mapping between individual new terms and the category to which each belongs. If the goal of the NLP model is identification and classification, details for every particular term may not be needed and, therefore, better performance may be achieved by aggregating results using the broader category names rather than processing the individual terms. Generic category names may be trained as novel terms into an NLP model, along with an initial definition for the new generic category. NLP models may map defined terms to a numerical vector, which is typically refined into a particular representation. By training the NLP model with generic category names, the NLP model may view each category name as an atomic unit, rather than breaking the name into a plurality of components, thus reducing computation overhead.

A block diagram for an embodiment of a computer system is illustrated in FIG. 1. As shown, computer system 100 includes term substitution process 120, natural-language processing (NLP) model 140, and map file 150. Computer system 100 receives user-generated content (UGC) 110, and generates modified UGC 130 and then UGC classification 145. Computer system 100, in various embodiments, may be implemented, for example, as a single computer system, a plurality of computer systems in a data center, as a plurality of computer systems in a plurality of data centers, and other such embodiments. In some embodiments, computer system 100 may be implemented as one or more virtual computer systems hosted by one or more server computer systems. Computer system 100 may be included as part of an online service that enables users to share content, such as UGC 110 provided by user 190.

Computer system 101 may include one or more processor circuits and a memory circuit that includes instructions that when executed by processor circuit, cause the system to perform operations described herein. As shown, computer system 100 is operable to update map file 150 to include a new keyword (new term 113) mapped to one of a plurality of category names (152a and 152c, collectively 152) that NLP model 140 is trained to identify. NLP model 140, however, is not trained to identify new term 113. As used herein, "keyword" refers to a term including one or more words that are of interest to an entity operating an online service. In the embodiment of FIG. 1, computer system 100 is included in such an online service and updates map file 150 with new terms of interest. New term 113 may be a word or phrase that has a recently developed a new use or connotation among a particular group of people, industries, scientific research, and the like. Accordingly, new term 113 is added to map file 150 such that NLP model 140 may be used to process content using new term 113. Terms included in map file 150 are mapped to a particular category name 152 that is representative of the mapped term.

As shown, new term 113 is added to map file 150 as term 112e, mapped to category name 152c. Term 112d is also mapped to category name 152c, while terms 112a and 112c are both mapped to category name 152a. Sharing a same category mapping may indicate that terms 112d and 112e share one or more similar characteristics that are represented by category name 152c. For example, terms 112d and 112e may each be names of restaurant chains and category name 152c is simply "restaurant" or "business." Terms 112a and 112c may be names of US states and category name 152a may be "USA" or "North America." Accordingly, map table 150 may be used to group different terms with one or more similarities to a common, broader term.

Computer system 100 is further operable to receive UGC 110 that includes the new term 113 (term 112e). UGC 110 may be received from user 190 as a message to another user of the online service, a message to an employee of the online service, a post or comment to a message board visible to multiple employees and/or users of the online service, and the like. For example, the online service may include a user forum in which users may seek help with various aspects of the online service. In such a forum, authorized users may have access to one or more message boards where they may be able to post questions, answer other users' question, or otherwise provide commentary.

As illustrated, computer system 100 is also operable to generate, using map file 150 and term substitution process 120, a modified version of UGC 110 (modified UGC 130) by substituting category name 152c for content included in UGC 110 that matches new term 112e. Term substitution process 120 receives UGC 110 and compares terms 112a, 112b, 112d, 112e, and 112g that are included in UGC 110 to the terms 112 that are mapped in map file 150. In the illustrated example, term substitution process 120 replaces term 112a with category name 152a, and terms 112d and 112e with category name 152c to create modified UGC 130. Terms 112b and 112g are not included in map file 150.

Accordingly, these terms may not be replaced, but rather copied to modified UGC 130.

Computer system 100, as shown, may be further operable to classify, using NLP model 140, modified UGC 130. NLP model 140 is not retrained to identify new term 113. In some embodiments, NLP model 140 may not be trained to identify terms 112a, 112c, 112d, or any other mapped terms 112 that may be included in map file 150. Instead, NLP model 140 is trained to identify category names 152a and 152c, as well as any other category names 152 that may be included in map file 150.

When performed, NLP model 140 may identify category names 152a and 152c, in addition to other terms NLP model 140 is trained to identify. Using the identified category names, NLP model may further process modified UGC 130 to determine a classification of modified UGC 130. Such a classification may associate modified UGC 130 (and thereby UGC 110) to a more general topic or tone. For example, UGC 110 may include an angry rant against the online service, an employee, another user, or the like. Within the rant, user 190 may have included profanity, derogatory terms, threats, and/or other such content that the entity operating the online service desires to keep out of a user forum. Terms 112a, 112d, and 112e may be associated with hate speech, terroristic threats, racial epithets, or the like. Category names 152a and 152c may be broader descriptions of such content. Using associations that NLP 140 has been trained recognize for category names 152a and 152c, NLP model 140 classifies modified UGC 130 as UGC classification 145. In the present example, UGC classification 145 may correspond to objectionable language that violates one or more rules for acceptable user generated content. In response to this classification, computer system 100 may reject UGC 110, accept (e.g., provisionally) UGC 110 but flag it for further analysis, and/or take other such precautions to avoid presenting objectionable content.

By training NLP model 140 to recognize the broader category names, new term 113 may be detected in UGC 110 without a need to retrain NLP model 140 how to recognize and process new term 113. Instead, new term 113 is replaced with the known category name 152c that NLP model 140 has been previously trained to detect and process. NLP model 140, in some embodiments, may be trained using a large established dataset. As new terms/keywords start to be used among a group of people, a need or desire to detect these new terms may be accomplished by adding the new terms to map file 150 and mapping them to existing category names, currently recognized by NLP model 140, thereby quickly incorporating the new terminology, yet avoiding a possibly time/resource consuming retraining operation for NLP model 140.

It is noted that computer system 100, as illustrated in FIG. 1, is merely an example. FIG. 1 has been simplified to highlight features relevant to this disclosure. In other embodiments, additional elements that are not shown may be included, and/or different numbers of the illustrated elements may be included. For example, one or more processors and/or memory circuits may be included in computer system 100 to perform term substitution process 120 and/or NLP model 140. NLP model 140 may, in the same or other embodiments, be trained to detect other types of content, such as fraudulent content (e.g., a user attempting to defraud another user or the entity), licensed intellectual property (e.g., music, videos, and the like) being improperly distributed, risky behavior of a user (e.g., associating with flagged users, descriptions of failing to complete electronic exchanges), and so forth. In some embodiments, NLP model may be used to determine if user-generated content is being sent to a proper message board in a forum or a proper customer service agent.

The description of FIG. 1 discloses use of a map file to substitute new terms for known category names in user-generated content prior to submitting the content to an NLP model for analysis. Term substitution may be implemented in a variety of manners. An example of how new term substitution may be performed in relation to the disclosed techniques is illustrated in FIG. 2.

Moving to FIG. 2, an example of user-generated content being processed using a term substitution technique is shown. Another embodiment of computer system 100 is depicted as receiving UGC 210 that includes four terms, term 212a to term 212d (collectively terms 212). Map file 250 is used to generate modified UGC 230 which is then used as input to NLP model 140.

As illustrated, UGC 210 is received by computer system 100, and contains four terms 212a-212d. In various embodiments, these terms may be words in a particular language, proper names, usernames, passcodes, or any other suitable combinations of alpha-numeric combinations that are capable of being classified by a natural-language processing model. Computer system 100 uses map file 250 to replace particular terms in received user-generated content. For UGC 210, computer system 100 identifies term 212c as a mapped term and replaces term 212c with category name 252 to generate modified UGC 230. Terms 212a, 212b, and 212d remain unchanged.

Computer system 100, as shown, uses NLP model 140 to process modified UGC 230. Processing by NLP model 140 includes taking each of terms 212a, 212b, and 212d and tokenizing these terms. As used herein, "tokenizing" includes segmenting read term 220 into a plurality of tokenized terms 225. Each tokenized term 225 includes a subset of characters of read term 220, and may then be assigned a numeric vector 227 that is indicative of one or more characteristics of the token. For example, read term 220 "Lorem" is segmented into five terms, "Lorem," "Lore," "Lor," "Lo," and "L," each with a respective numeric vector 227 that is indicative of the characters in each token. Although the tokenized terms 225 are depicted as including at least a first letter of the corresponding read term 220, in other embodiments, any portion of the read term 220 may be used as a tokenized term 225.

As illustrated, NLP model 140 is trained to identify and define category name 252 as an atomic unit. As used herein, "atomic unit" refers to a term that is not further segmented, but instead is in a smallest state in which the NLP model will process the term. For example, terms 212a, 212b, and 212d are shown segmented down to a single character. Category name 252, however, is not segmented. The complete string of category name 252, "[flagged user]," is the only tokenized term 225 associated with the read term 220. "[Flagged user]" is treated as a smallest unit for the corresponding read term 220. Accordingly, any usage of category name 252 in UGC 210 or other user-generated content processed by NLP model 140 will be processed in a same manner, using the same value for numeric vector 227.

Defining the category names as atomic units includes mapping ones of the category names to a respective generic term that represents one or more characteristics of terms mapped to the corresponding category name. For example, term 212c included in map file 250 is an identity (e.g., a proper name, username, email address, etc.) of a flagged user. In some embodiments, category name 252 may further indicate a respective reason for the identified user being flagged, such as one or more violations of rules of use for an online system, information from a third-party database regarding illegal and/or disreputable behavior by the identified user, and the like.

Mapped terms included in map file 250 may also include respective names of a plurality of institutions, such as businesses, organizations, universities, and the like. The respective category names may indicate a respective type of institution, e.g., [restaurant], [public college], [political action group], [hate group], and others. Furthermore, mapped terms included in map file 250 may include respective instances of undesired language. These category names may indicate a respective indication of a type of undesired language, such as [profanity], [derogatory name], [terroristic threat], [slander], and so forth.

Use of such term substitution prior to processing content with an NLP model may provide several advantages. The substitution may provide an initial analysis of one or more terms included in the content. Replacing a mapped term with a category name provides an initial classification of the replaced term, potentially reducing processing bandwidth used by a computer system to perform an NLP model. Since no model re-training is needed to add a new term to the map file, updating the computer system to identify new terms may be accomplished quicker than if an NLP model had to be re-trained. In addition, resources required to perform the re-training (e.g., both human and computer resources) are available for other tasks.

It is noted that the embodiment of FIG. 2 is merely an example to demonstrate the disclosed concepts. Although the strings used for the example terms do not correspond to words in any language, terms 212 may be recognized words from any suitable language. Although four terms are shown, any suitable number of terms may be included in user-generated content.

FIGS. 1 and 2 disclose use of existing category names in a map file used to replace terms in user-generated content. In some cases, one or more new terms may be more accurately mapped to a new category name, rather than a category name existing in the map file. An example of adding a new category name to an existing map file is depicted in FIG. 3.

Turning to FIG. 3, a block diagram of another embodiment of computer system 100 is depicted. Computer system 100 includes NLP model 140 from FIG. 1, as well as map file 350 and training data 310. Map file 350 is shown at two points in time, time t0 before new category name 352d is added, and time t1 after adding new category name 352d.

As shown at time t0, map file 350 includes four terms 312a-312d. terms 312a-312c are mapped to category name 352a, while term 312d is mapped to category name 352b. Each of category names 352a and 352b (collectively 352) include associations 355a and 355b (collectively 355), respectively. Associations 355 provide information to NLP model 140 that indicates characteristics of the respective category names 352. Associations 355 may enable NLP model 140 to define and/or process the respective category names 352. For example, in some embodiments, associations 355 may correspond to or include numeric vectors, such as numeric vectors 227 in FIG. 2.

At time t1, computer system 100 is operable to receive new category name 352d and terms 312d, 312m, and 312s that are associated with new category name 352d. New category name 352d may be added by a system administrator, or by a process such as described below in regards to FIG. 4. Similarly, the associated terms 312d, 312m, and 312s may, in various embodiments, be listed by the system administrator, generated by the process described below, or a combination thereof.

Computer system 100 is operable to search existing training data 310 to identify terms included in training data 310 that are adjacent to terms 312*d*, 312*m*, and 312*s* on the list. Training data 310 may include examples of user-generated content that has previously been received by computer system 100, and/or content that was not actually user-generated, but is exemplary of what users may submit. Accordingly, training data 310 may include a collection of paragraphs, sentences, and/or phrases that may include one or more of terms 312*d*, 312*m*, and 312*s*. As shown, term 312*d* is found in training data 310, surrounded by terms 312*c* and 312*e*. These terms 312*c* and 312*e* are added to a list of surrounding terms 314. Although terms 312*c* and 312*e* are immediately adjacent to term 312*d* in training data 310, in other cases, surrounding terms 314 may include any term that appears in a given sentence with term 312*d*, or may include terms that appear in a sentence with term 312*d* multiple times.

Using the surrounding terms 314 and NLP model 140, computer system 100 may be further operable to generate default associations 355*d* for new category name 352*d*. For example, text from training data 310, including complete sentences that include term 312*d* and/or surrounding terms 314, may be processed using NLP model 140, resulting in one or more classifications being assigned. Associations 355*d* may be taken from the resultant classifications. These default associations 355*d* may allow NLP model to more accurately use new category name 352*d* as additional data is collected during normal operation of NLP model 140. Over time, the additional collected data may be used to refine associations 355*d*, further increasing an accuracy with which NLP model 140 is able to process new category name 352*d*.

After the initial associations 355*d* are generated, new category name 352*d* may be added to map file 350. The associated terms initially provided with new category name 352*d* may be added (if not already included) to map file 350, and mapped to new category name 352*d*. In addition, one or more terms from surrounding terms 314 may be remapped to new category name 352*d*. As shown, for example, term 312*d* is remapped from category name 352*b* to new category name 352*d*. Terms 312*m* and 312*s* are added to map file 350 and also mapped to new category name 352*d*. Term 312*c*, which was identified as one of surrounding terms 314, is remapped from category name 312*a* to new category name 352*d*. Such remapping may occur if computer system 100 determines that a new category name is more descriptive of an existing term than the currently mapped category name.

Use of such a process to establish default associations for a new category name and to remap existing terms to a new category name may enable automation of a term identifying process and/or increase an accuracy of the term identifying process, thereby improving effectiveness. Depending on a use case (or cases) for the term identifying process, user satisfaction may be increased, use of human and/or computer resources may be reduced, risk of fraudulent activity by users may be reduced, and adherence to security and/or licensing regulations may be increased.

It is noted that FIG. 3 is an example to demonstrate the disclosed concepts. Only elements needed to illustrate these concepts are shown. In other embodiments, the map file may have a different number of mapped terms and categories, and training data may include a larger number of terms.

In FIG. 1, a new term is added to a map file and mapped to a particular category name. In some embodiments, the mapping may be determined by one or more system administrators who maintain the map file. In other embodiments, a computer system may be used to select the category name to map to the new term. FIG. 4 illustrates a technique for identifying a suitable category name for a new term.

Proceeding to FIG. 4, a block diagram of another embodiment of computer system 100 is depicted in which a natural-language processing graph is used to identify links between a new term and other terms in user-generated content. Computer system 100 includes NLP model 140 and map file 450. UGC 410 is received by computer system 100, including a new term 412*b* that has not been mapped to a category name in map file 450. Rather than a system administrator or data engineer assigning a category name, NLP model 140 is used to generate a recommendation for a category name.

To add the new term 412*b* to map file 450, computer system 100 is operable to graph term 412*b* with adjacent text in UGC 410 to select an initial category name of the plurality of category names 452 to map to term 412*b*. Computer system 100 performs NLP model 140 with UGC 410 as input. NLP model 140 includes a capability to generate data graphs for analyzing the input content. Based on the input of UGC 410, NLP model 140 generates NLP graph 445. In NLP graph 445, terms 412 included in UGC 410 are used as graph nodes and links 460 are identified between various pairs of terms 412. It is noted that the two letters at the end of the reference numbers for links 460 indicate the two terms 412 that are common to a given link 460. For example, three links (460*ab*, 460*bd*, and 460*be*) are identified between the new term 412*b* and terms 412*a*, 412*d*, and 412*e*. Links may be established based on a number of identifiable relationships, including a proximity between the two linked terms 412, a number of times the two linked terms are used in a same sentence, a lexicological similarity between the linked terms, and combinations thereof.

After being identified, links 460*ab*, 460*bd*, and 460*be* may be used to select a category name from existing category names 452 included in map file 450. For example, two category names 452*a* and 452*c* are shown in FIG. 4. Terms 412*a* and 412*c* are mapped to category name 452*a*, while terms 412*d* and 412*e* are mapped to category name 452*c*. Since two of the three terms that term 412*b* is linked to are mapped to category name 452*c*, term 412*b* is also mapped to category name 452*c*. In other embodiments, other factors may be used to select a category name. For example, links 460 may be weighted based on a number and/or type of similarities between two terms. If link 460*ab* indicates multiple occurrences of term 412*b* and 412*a* being used in a same sentence and these two terms have similar idiomatic usage, then link 460*ab* may be weighted heavily. If, in contrast, links 460*bd* and 460*be* are indicative of single occurrences of term 412*b* with each of terms 412*d* and 412*e*, then links 460*bd* and 460*be* may be weighted lightly, and category name 452*a* may be selected instead of category name 452*c*.

In some embodiments, links 460*ab*, 460*bd*, and 460*be* may provide an indication of a new category name. For example, if links generated for a new term result in association with two or more existing category names, then NLP model 140 may generate a suggestion for a new category name that is indicative of similarities among, and/or a combination of the existing category names. For instance, if one existing category name is [licensed music] and another category name is [licensed video], then a new category of [licensed music video] may be suggested. After such a new category name is suggested, then a process such as described for FIG. 3 may be used to determine associates and add the new category name to the map file.

It is noted that the embodiment of FIG. 4 is merely an example. Illustrated elements have been limited for clarity. In other embodiments, the user-generated content and/or the map file may include a different number of terms. The resulting NLP graph may include a different number of nodes and/or links.

Figure 5:
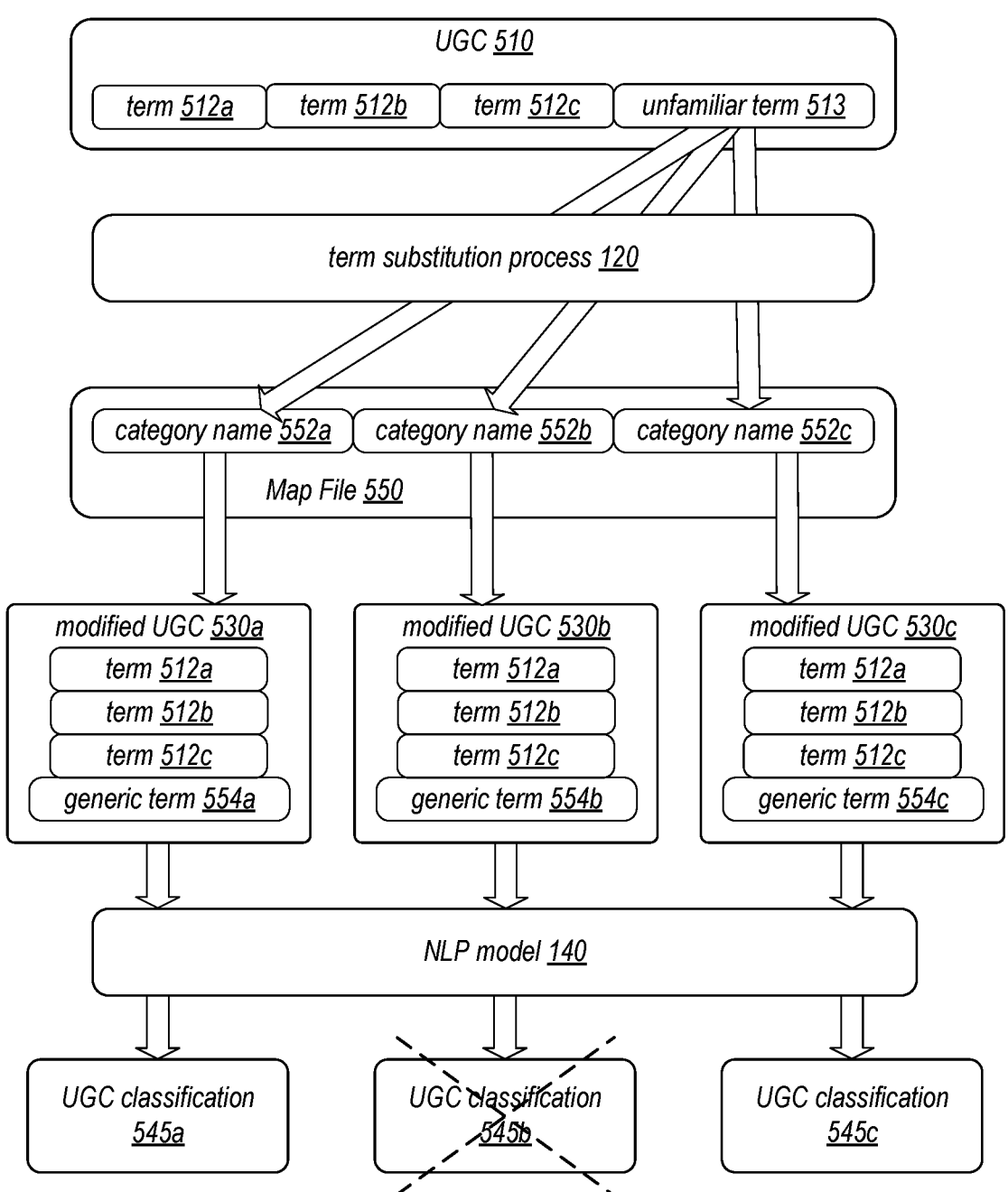
FIG. 5 shows a diagram of an example for classifying an unfamiliar term.

FIG. 4 describes a technique for selecting a category name for a new term. Various methods may be utilized for identifying category names for new terms. In FIG. 5 another such technique is depicted.

Moving now to FIG. 5, an example of an iterative process for selecting a category name for an unfamiliar term included in user-generated content is shown. Computer system 100 receives UGC 510 that includes several terms 512a-512c as well as unfamiliar term 513. Computer system 100 uses term substitution process 120, map file 550, and NLP model 140 to determine a category name for unfamiliar term 513.

As illustrated, computer system 100 is operable to generate a modified version of UGC 510 by substituting a given one of category names 552a-552c for unfamiliar term 513 in UGC 510. Using term substitution process 120, for example, modified UGC 530a is generated by replacing unfamiliar term 513 with category name 552a from map file 550. NLP model 140 may then be used to generate a respective UGC classification 545a of modified UGC 530a. UGC classification 545a, therefore, represents a classification of UGC 510 if unfamiliar term 513 is mapped to category name 552a.

Computer system 100 may be operable to generate a set of category names for unfamiliar term 513 by repeating the generation of respective classifications, substituting a different one of category names 552 for unfamiliar term 513 in ones of the iterations. As shown, term substitution process 120 is repeated two more times, once to generate modified UGC 530b using category name 552b for unfamiliar term 513, and a second time to generate modified UGC 530c using category name 552c for unfamiliar term 513. NLP model 140 is used to generate corresponding UGC classifications 545b and 545c using, respectively, modified UGC 530b and 530c. For some category names, such as category name 552b, NLP model 140 may not be able to resolve to a particular UGC classification, or a resulting UGC classification 545b may have a weak correlation to modified UGC 530b. In such cases, category name 552 may be eliminated from the set of category names to consider for unfamiliar term 513.

As illustrated, computer system 100 is also operable to select, from the set of category names, a particular category name for unfamiliar term 513. In the illustrated example, the set of category names includes category names 552a and 552c. In some embodiments, computer system 100 may be operable to select one (e.g., category name 552c) from the set to map to unfamiliar term 513. For example, computer system 100 may compare a correlation value associated with UGC classification 545a to a correlation value for UGC classification 545c. A correlation value may, in some embodiments, be a numeric representation of how well a given UGC classification corresponds to the modified UGC used as an input. In the current example, UGC classification 545c may correlate to modified UGC 530c better than UGC classification 545a may correlate to modified UGC 530a, resulting in category name 552c being selected. In other embodiments, the set of category names may be presented to a system administrator or data engineer for selecting one category name for unfamiliar term 513.

It is noted that example 500 of FIG. 5 is an example for demonstrating disclosed concepts. Although only three iterations of generating modified UGC are included in the example, any suitable number of iterations may be performed, including hundreds, thousands, or millions of iterations. In some embodiments, the technique of FIG. 5 may be performed in combination with the technique of FIG. 4 to determine a suitable category name for an unfamiliar term.

FIGS. 1-5. describe various embodiments of a computer system for using term replacement to generate modified UGC as input for an NLP model. NLP models may be used in a variety of use cases. FIG. 6 illustrates several such use cases.

Turning now to FIG. 6, three examples of use cases in which a computer system may be used to modify user-generated content in order to detect particular terminology is shown. Example 600a shows use of term substitution for entities involved in electronic exchanges. Example 600b depicts substitution of terms related to online scams. Example 600c illustrates substituting terms related to hate speech.

Examples 600a-600c include maintaining respective map files 650 that include a plurality of terms 612 that are mapped to respective ones of a plurality of category names 652 that a natural-language processing (NLP) model (e.g., NLP model 140 in FIGS. 1-5) is trained to identify. The NLP model, however, is not trained to identify the terms 612. As described above, terms 612 may be added to a given map file 650 and mapped to a broader category name 652. For example, the [EDUCATIONAL_ENTITY] category name in map file 650a may be mapped to many different known educational institutions. New educational institutions may be added to map file 650a and mapped to the same category name. Since the NLP model is trained to identify [EDUCATIONAL_ENTITY], the NLP model does not have to be retrained to identify newly added educational institutions.

Examples 600a-600c further include retrieving respective ones of UGC 610a-610c. In various embodiments, UGC 610 may be sent to a computer system, such as by a user submitting content to be posted in a forum, or may be retrieved by a computer system, e.g., by a process running on the computer system to scan for new content. In each example 600, the respective UGC 610 includes one or more of terms 612 that are included in the corresponding map file 650. A term substitution process (e.g., term substitution process 120 in FIGS. 1 and 5) is used to generate, using the map file, a modified version of the UGC by substituting the respective category name 652 for terms 612 identified in UGC 610.

The NLP model may then be used to classify modified UGC 610 without retraining the NLP model to identify terms 612. For instance, example 600b includes identifying users who may participate in fraudulent activity. If a user who has never been observed performing any sort of questionable activity that may be associated with fraud may not be included in map file 650b. After this user is determined to have participated in a particular scam, then the user may be added to map file 650b by mapping them to a particular category of fraudulent activity. If their name comes up in a subsequent UGC, then their name will be replaced with the mapped category name and the NLP model will be capable of processing the subsequent UGC, including detecting that a user associated with the particular category of fraudulent activity is mentioned in the subsequent UGC. If a purpose of processing the subsequent UGC is to determine if the UGC may be part of a scam, then knowing an identity of the specific user may not be important, but rather knowing that a user involved with fraud has been mentioned in the UGC may be enough, when combined with other terms identified in the subsequent UGC to, for example, flag or reject the subsequent UGC.

It is noted that FIG. 6 merely illustrates several examples of use cases for the disclosed techniques. For clarity, only three example use cases are illustrated. These examples are not intended to be limiting.

The systems described above in FIGS. 1-6 may use a variety of methods for implementing the disclosed techniques. Several such methods for performing term substitution and identifying particular types of terms are described below in FIGS. 7-9.

Proceeding now to FIG. 7, a flow diagram for an embodiment of a method for generating modified user-generated content to a natural-language process model is shown. Method 700 may be performed by a computer system such as computer system 100 in FIGS. 1-5. For example, computer system 100 may include (or have access to) a non-transient, computer-readable medium having program instructions stored thereon that are executable by computer system 100 to cause the operations described with reference to FIG. 7. Method 700 is described below using computer system 100 of FIG. 1 as an example. References to elements in FIG. 1 are included as non-limiting examples.

Method 700 begins at 710 by storing, by a computer system, a map file that includes a new term that is mapped to a particular one of a plurality of category names that a natural-language processing (NLP) model is trained to identify. For example, computer system 100 may be operable to update map file 150 to include a new keyword (new term 113) mapped to category name 152c of the plurality of category names (152a and 152c). NLP model 140 may be trained to identify category names 152a and 152c. NLP model 140, however, is not trained to identify new term 113. Terms included in map file 150 are mapped to a particular category name 152 that is representative of the mapped term. In some embodiments, mapping new term 113 to category name 152c includes graphing new term 113 with surrounding text in UGC 110 to select an initial category name of the plurality of category names, such as described in regards to FIG. 4.

At 720, method 700 continues by receiving, by the computer system, user-generated content (UGC) that includes the new term. For example, computer system 100 may be further operable to receive UGC 110 that includes the new term 113 (term 112e). As described above, computer system 100 may, in various embodiments, receive UGC 110 from another computer system (such as a device used by user 190), or may execute a background process that scans locations where user-generated content is stored to identify new content that has not been processed by NLP model 140.

Method 700 continues at 730 by generating, by the computer system using the map file, a modified version of the UGC by substituting the particular category name for text in the UGC that is associated with the new term. Computer system 100, for example, may also be operable to generate modified UGC 130 by substituting category name 152c from map file 150 for content included in UGC 110 that matches new term 112e. E.g., term substitution process 120 may compare terms 112a, 112b, 112d, 112e, and 112g that are included in UGC 110 to the terms 112 that are included in map file 150 As shown in FIG. 1, term 112a is replaced with category name 152a, and terms 112d and 112e are replaced with category name 152c, thereby creating modified UGC 130. Other terms not included in map file 150 may not be replaced, but rather copied to modified UGC 130.

At 740, method 700 proceeds by using, by the computer system, the NLP model on the modified text to classify the modified version of the UGC without retraining the NLP model to identify the new term. For example, NLP model 140 may identify category names 152a and 152c, in addition to other terms NLP model 140 is trained to identify. Using the identified category names, NLP model may further process modified UGC 130 to determine a classification of modified UGC 130. Such a classification may associate modified UGC 130 (and thereby UGC 110) to a particular topic, or type of content. In various embodiments, the classification may determine what computer system 100 does with UGC 110. If, for example, the classification indicates that UGC 110 is a type of content that is prohibited from being presented (e.g., offensive content, illegal use of licensed content, a lure to a scam, and the like), then computer system 100 may flag or delete UGC 110. Otherwise, if the classification associates UGC 110 with an acceptable type of content, then UGC 110 may be presented as user 190 intended.

It is noted that the method of FIG. 7 includes elements 710-740. Method 700 may end in 740 or may repeat some or all elements of the method. For example, method 700 may return to 720 to process new user-generated content. In some cases, method 700 may be performed concurrently with other instances of the method. For example, multiple instances of method 700 may be performed to process a plurality of user-generated content concurrently.

Moving now to FIG. 8, a flow diagram for an embodiment of a method for adding a new category name to a map file is shown. Similar to method 700, method 800 may also be performed by a computer system such as computer systems 100. Computer system 101, in some embodiments, may include (or have access to) a non-transient, computer-readable medium having program instructions stored thereon that are executable by computer system 100 to cause the operations described with reference to FIG. 8. Method 800 is described below using computer system 100 of FIG. 3 as an example. References to elements in FIG. 3 are included as non-limiting examples.

Method 800 begins at 810 by receiving a new category name and a list of terms associated with the new category name. For example, computer system 100 may be operable to receive new category name 352d and terms 312d, 312m, and 312s that are associated with new category name 352d. The new category name 352d and associated terms 312d, 312m, and 312s, may, in various embodiments, be added by a system administrator or data engineer, or by a process running, e.g., on computer system 100, that may determine a new category name when assigning a category to a new term, such as described in regards to FIG. 4.

At 820, method 800 continues by identifying training terms in existing training data that surround terms on the list. Computer system 100, for example, may be operable to search existing training data 310 to identify terms included in training data 310 that are adjacent to terms 312d, 312m, and 312s on the list. Training data 310 may include a collection of paragraphs, sentences, and/or phrases that may include one or more of terms 312d, 312m, and 312s. Term 312d, as shown in FIG. 3, is identified in training data 310, surrounded by terms 312c and 312e. The identified terms are added to surrounding terms 314. It is noted that the terms "adjacent" and "surrounding" are used herein to describe terms that appears in a given sentence with terms on the list, and are not intended to be limited to terms that are immediately next to the terms on the list.

Method 800 continues at 830 by using the identified training terms and the NLP model, generating default associations for the new category name. For example, text from training data 310, including complete sentences that include term 312*d* and/or surrounding terms 314, may be processed using NLP model 140, resulting in one or more classifications being assigned. Associations 355*d* may be taken from the resultant classifications, e.g., by using associations for other category names that produce similar classifications. As category name 352*d* is used in subsequent performances of NLP model 140, additional data may be collected and used to further refine associations 355*d*.

At 840, method 800 proceeds by adding the new category name to the map file and mapping one or more of the identified training terms to the new category name. The associated terms initially provided with new category name 352*d* may, for example, be added (if not already included) to map file 350, and mapped to new category name 352*d*. In addition, one or more terms from surrounding terms 314 may be remapped to new category name 352*d*.

In some embodiments, method 800 may further include training the NLP model to identify and define ones of the category names as an atomic unit. As described above, defining the category names as atomic units may include mapping ones of the category names to a respective generic term that represents one or more characteristics of terms mapped to the corresponding category name. For example, a category name may be treated as a smallest unit, and not tokenized into segments such as described in regards to FIG. 2. Accordingly, various usage of a given category name in different instances of modified user-generated content may be processed in a same manner, resulting in consistent treatment of any term mapped to a same category name.

It is noted that the method of FIG. 8 includes elements 810-840. Method 800 may end in 840 or may repeat some or all elements of the method. For example, method 800 may return to 810 to process additional new category names. In some cases, method 800 may be performed concurrently with other instances of the method. For example, a plurality of new category names may be processed concurrently.

Turning now to FIG. 9, a flow diagram of a method for selecting a category name for an unfamiliar term is illustrated. In a similar manner as methods 700 and 800, method 900 may be performed by computer system 100, or other similar computer systems. The computer system may, for example, include (or have access to) a non-transient, computer-readable medium having program instructions stored thereon that are executable by the computer system to cause the operations described with reference to FIG. 9. In some embodiments, method 900 may be performed prior to method 700, resulting in a new term being added to a map file before user-generated content is received by the computer system. Method 900 is described below using FIG. 5 as an example. References to elements in FIG. 5 are included as non-limiting examples.

Method 900 begins at 910 by iteratively generating a respective modified version of a UGC by substituting a given category name for an unfamiliar term in the different UGC, substituting a different category name in different ones of the iterations. As shown in FIG. 5, for example, computer system 100 may be operable to generate a modified version of UGC 510 by substituting a given one of category names 552*a*-552*c* for unfamiliar term 513 in UGC 510. Using term substitution process 120, for example, modified UGC 530*a* is generated by replacing unfamiliar term 513 with category name 552*a* from map file 550. Computer system 100 may repeat this operation using category names 552*b* and 552*c* to generate modified UGCs 530*b* and 530*c*. In some embodiments, selection of particular category names 552 to use in the different iterations may be based on category names associated with other terms included in UGC 510.

At 920, method 900 continues by using the NLP model to generate a respective classification of the respective modified UGCs. NLP model 140 is used to generate corresponding UGC classifications 545*a*, 545*b*, and 545*c* using, respectively, modified UGC 530*a*, 530*b*, and 530*c*. For some category names, such as category name 552*b*, NLP model 140 may not be able to resolve to a particular UGC classification, or a resulting UGC classification 545*b* may have a weak correlation to modified UGC 530*b*. In such cases, category name 552 may be eliminated from the set of category names to consider for unfamiliar term 513, thereby leaving, as shown, category names 552*a* and 552*c* in the set.

Method 900 may proceed to 930 by selecting a particular category name for the unfamiliar term using the respective classifications. As shown in FIG. 5, for example, computer system 100 may be operable to select category name 552*c* from the set of category names generated by the iterative process. Unfamiliar term 513 may then be mapped to category name 552*c*. In other embodiments, the generated set of category names may be presented to a system administrator or data engineer for selecting one category name for unfamiliar term 513.

It is noted that method 900 includes elements 910-930. Method 900 may end in 930 or may repeat some or all elements of the method. In some embodiments, for example, 910 and 920 may be repeated until all category names to considered have been used to generate corresponding modified UGCs in 910 which are then processed in 920. Although shown as occurring in a linear fashion, 910 and 920 may be performed concurrently. For example, after 910 results in a first modified UGC being generated, 910 may repeat to generate a second modified UGC while 920 generates a classification for the first modified UGC. Any of the disclosed methods may be performed concurrently with other instances of the other methods method. For example, new category names may be processed using method 800 while a category name is being determined for an undefined term using method 900.

Figure 10:
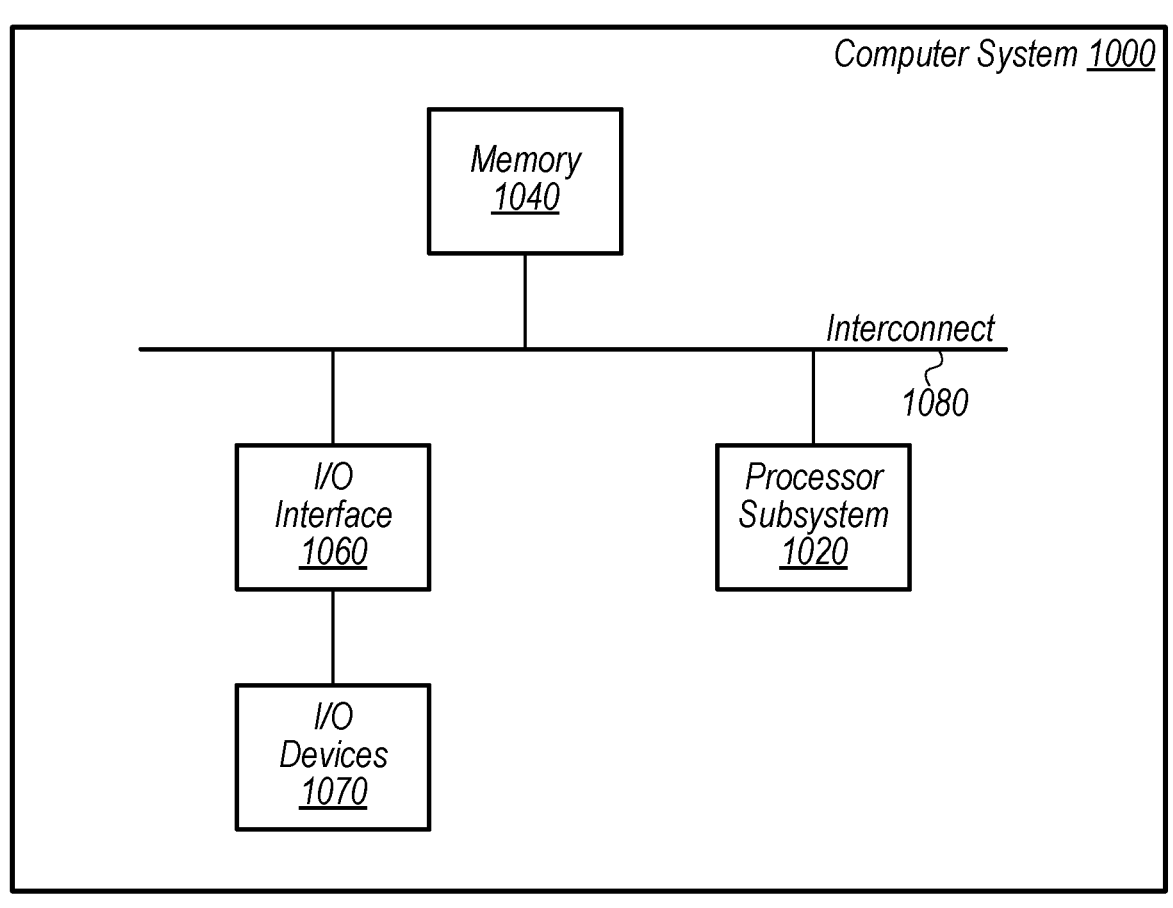
FIG. 10 depicts a block diagram of an embodiment of a computer system that may be used to implement one or more embodiments of the disclosed system.

In the descriptions of FIGS. 1-9, various embodiments of a computer system for implementing the disclosed techniques have been disclosed, such as computer system 100 in FIGS. 1-5. The computer system may be implemented in a variety of manners. FIG. 10 provides an example of a computer system that may correspond to one or more of the disclosed systems.

Referring now to FIG. 10, a block diagram of an example computer system 1000 is depicted. Computer system 1000 may, in various embodiments, implement one or more of the disclosed computer systems, such as computer system 100. Computer system 1000 includes a processor subsystem 1020 that is coupled to a system memory 1040 and I/O interfaces(s) 1060 via an interconnect 1080 (e.g., a system bus). I/O interface(s) 1060 is coupled to one or more I/O devices 1070. Computer system 1000 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc.

Although a single computer system 1000 is shown in FIG. 10 for convenience, computer system 1000 may also be implemented as two or more computer systems operating together, e.g., as a virtual computer system.

Processor subsystem 1020 may include one or more processor circuits. In various embodiments of computer system 1000, multiple instances of processor subsystem 1020 may be coupled to interconnect 1080. In various embodiments, processor subsystem 1020 (or each processor unit within 1020) may contain a cache or other form of on-board memory.

System memory 1040 is usable to store program instructions executable by processor subsystem 1020 to cause computer system 1000 perform various operations described herein, including, for example, any of methods 700-900. System memory 1040 may be implemented using any suitable type of memory circuits including, for example, different physical, non-transient, computer-readable media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory circuits in computer system 1000 are not limited to primary storage such as system memory 1040. Rather, computer system 1000 may also include other forms of storage such as cache memory in processor subsystem 1020 and secondary storage in I/O devices 1070 (e.g., a hard drive, storage array, etc.). In some embodiments, these other forms of storage may also store program instructions executable by processor subsystem 1020.

I/O interfaces 1060 may be any of various types of interfaces configured to couple to and communicate with other devices, according to various embodiments. In one embodiment, I/O interface 1060 is a bridge chip (e.g., Southbridge) from a front-side to one or more back-side buses. I/O interfaces 1060 may be coupled to one or more I/O devices 1070 via one or more corresponding buses or other interfaces. Examples of I/O devices 1070 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1070 includes a network interface device (e.g., configured to communicate over Wi-Fi®, Bluetooth®, Ethernet, etc.), and computer system 1000 is coupled to a network via the network interface device.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various operations that are performed in the context of instructions executed by one or more computer systems. For example, methods 700-900 are described as, in some embodiments, being performed by computer system 100 as shown in various ones of FIGS. 1-5. In addition, various processes (e.g., term substitution process 120 in FIG. 1) are described as being performed by a computer system such as computer system 100 in FIGS. 1-5). Computer system 100 may include one or more computer systems included, for example, in one or more data centers (physical facilities that store data that drives enterprise computing applications and provides online services to users via, e.g., the Internet). These components, therefore, are implemented on physical structures (i.e., on computer hardware).

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processor circuits or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method comprising:

storing, by a computer system, a map file that includes a new term that is mapped to a particular one of a plurality of category names that a natural-language processing (NLP) model is trained to identify;

receiving, by the computer system, user-generated content (UGC) that includes a plurality of terms, including the new term;

determining, by the computer system, that the map file includes an entry for the new term, wherein the entry includes one or more terms associated with the new term;

identifying, by the computer system using the entry for the new term, a particular category name that is mapped to the new term;

generating, by the computer system, a modified version of the UGC by substituting the particular category name for the new term in the UGC wherein remaining ones of the plurality of terms are retained in the modified version of the UGC; and using, by the computer system, the NLP model on the modified version of the UGC to classify the modified version of the UGC, wherein the NLP model is trained to identify the particular category name but not the new term, and wherein classifying the modified version of the UGC includes:

identifying whether any of the one or more associated terms are included in the UGC; and selecting a classification based on a number of the associated terms identified in the UGC and proximity of the identified associated terms to the category name.

2. The method of claim 1, further comprising training the NLP model to identify and define ones of the category names as an atomic unit.

3. The method of claim 2, wherein defining the category names as atomic units includes mapping ones of the category names to a respective generic term that represents one or more characteristics of terms mapped to a corresponding category name.

4. The method of claim 1, wherein mapping the new term to the particular category name includes graphing the new term with surrounding ones of the plurality of terms in the UGC to select an initial category name of the plurality of category names.

5. The method of claim 1, further comprising:
receiving a new category name and a list of terms associated with the new category name; and
identifying training terms in existing training data that surround terms on the list.

6. The method of claim 5, further comprising:
using the identified training terms and the NLP model, generating default associations for the new category name; and
adding the new category name to the map file and mapping one or more of the identified training terms to the new category name.

7. The method of claim 1, further comprising using the NLP model to identify additional new terms in a different UGC by:
iteratively generating a respective modified version of the different UGC by substituting a given category name for an unfamiliar term in the different UGC, wherein a different category name is substituted in ones of the iterations;
using the NLP model to generate a respective classification of the respective modified different UGCs; and
selecting a particular category name for the unfamiliar term using the respective classifications.

8. The method of claim 1, wherein mapped terms included in the map file are respective names of a plurality of institutions, and wherein the category names indicate a respective type of institution.

9. The method of claim 1, wherein mapped terms included in the map file are respective identities of flagged users, and wherein the category names indicate a respective reason for being flagged.

10. The method of claim 1, wherein mapped terms included in the map file are respective instances of undesired language, and wherein the category names indicate a respective indication of a type of undesired language.

11. A computer-readable, non-transient memory including instructions that when executed by a computer system within a computer network, cause the computer system to perform operations including:
maintaining a map file that includes a plurality of keywords that are mapped to respective ones of a plurality of category names that a natural-language processing (NLP) model is trained to identify;
retrieving user-generated content (UGC) that includes a plurality of terms, including one or more of the keywords;
determining that the map file includes respective entries for the one or more keywords;

using the respective entries to identify a respective category name that is mapped to ones of the one or more keywords;
generating a modified version of the UGC by substituting the respective category names for the keywords included in the UGC, wherein remaining ones of the plurality of terms are retained in the modified version of the UGC; and
classifying, using the NLP model, the modified version of the UGC, the classifying including:
retrieving one or more associated terms from the respective entries, the associated terms indicating a context for usage of respective ones of the one or more keywords; and
selecting a classification based on a proximity of the identified associated terms to the respective category name.

12. The computer-readable, non-transient memory of claim 11, wherein the operations further include training the NLP model to define ones of the category names as an atomic unit by mapping ones of the category names to a respective generic term that represents one or more characteristics of keywords mapped to a corresponding category name.

13. The computer-readable, non-transient memory of claim 11, wherein the operations further include:
receiving a new category name and one or more keywords associated with the new category name; and
search existing training data to identify training keywords that are adjacent to keywords of the one or more keywords.

14. The computer-readable, non-transient memory of claim 13, wherein the operations further include:
using the identified training keywords and the NLP model to generate default associations for the new category name; and
adding the new category name to the map file and mapping one or more of the identified training keywords to the new category name.

15. The computer-readable, non-transient memory of claim 11, wherein the operations further include using the NLP model to identify additional new keywords in a different UGC by:
generating a modified version of the different UGC by substituting a given category name for an unfamiliar term in the different UGC; and
using the NLP model to generate a respective classification of the respective modified different UGCs.

16. A system comprising:
a processor circuit; and
a memory circuit including instructions that when executed by processor circuit, cause the system to perform operations including:
updating a map file to include a new keyword mapped to one of a plurality of category names that a natural-language processing (NLP) model is trained to identify, wherein the map file also includes one or more associated terms that are indicative of a usage context of the new keyword;
receiving user-generated content (UGC) that includes a plurality of terms, including the new keyword;
determining that the map file includes an entry for the new keyword;
extracting, from the entry, the one category name that is mapped to the new keyword;
generating a modified version of the UGC by substituting the one category name for content included in the UGC that matches the new keyword, wherein remaining ones of the plurality of terms are retained in the modified version of the UGC; and classifying, using the NLP model, the modified version of the UGC, wherein the classifying includes selecting a classification based on a number of the associated terms identified in the UGC and proximity of the identified associated terms to the category name.

17. The system of claim 16, wherein to add the new keyword to the map file, the operations further include graphing the new keyword with adjacent ones of the plurality of terms in the UGC to select an initial category name of the plurality of category names to map to the new keyword.

18. The system of claim 16, wherein the operations further include:

generating a modified version of a different UGC by substituting a given category name for an unfamiliar term in the different UGC; and using the NLP model to generate a respective classification of the respective modified different UGCs.

19. The system of claim 18, wherein the operations further include:

generating a set of category names for the unfamiliar term by repeating the generation of respective classifications, substituting a different category name for the unfamiliar term in corresponding iterations; and selecting, from the set of category names, a particular category name for the unfamiliar term.

20. The system of claim 16, wherein the operations further include:

receiving a new category name and a list of keywords associated with the new category name;

identifying training keywords in existing training data that surround keywords on the list; and generating, using the identified training keywords and the NLP model, default associations for the new category name.

\* \* \* \* \*